United States Patent
Kim (10) Patent No.: US 11,374,209 B1
(45) Date of Patent: Jun. 28, 2022

(54) HIGH-ENERGY CATHODES, BATTERIES, AND METHODS OF MAKING THE SAME

(71) Applicant: WATTRII, INC., Cedar Park, TX (US)

(72) Inventor: Jangwoo Kim, San Marcos, TX (US)

(73) Assignee: WATTRII, INC., Cedar Park, TX (US)

( * ) Notice: Subject to any disclaimer, the term of this patent is extended or adjusted under 35 U.S.C. 154(b) by 0 days.

(21) Appl. No.: 17/175,267

(22) Filed: Feb. 12, 2021

(51) Int. Cl.
| | |
|---|---|
| *H01M 4/00* | (2006.01) |
| *H01M 4/04* | (2006.01) |
| *H01M 4/133* | (2010.01) |
| *H01M 4/1315* | (2010.01) |
| *H01M 4/1391* | (2010.01) |
| *H01M 10/0525* | (2010.01) |
| *H01M 4/62* | (2006.01) |
| *H01M 4/36* | (2006.01) |
| *H01M 4/66* | (2006.01) |
| *H01M 4/1393* | (2010.01) |

(52) U.S. Cl.
CPC ......... *H01M 4/0471* (2013.01); *H01M 4/133* (2013.01); *H01M 4/1315* (2013.01); *H01M 4/1391* (2013.01); *H01M 4/1393* (2013.01); *H01M 4/366* (2013.01); *H01M 4/622* (2013.01); *H01M 4/661* (2013.01); *H01M 10/0525* (2013.01)

(58) Field of Classification Search
CPC .. H01M 4/525; H01M 4/505; H01M 10/0525; C01G 53/00
See application file for complete search history.

(56) References Cited

U.S. PATENT DOCUMENTS

| | | | |
|---|---|---|---|
| 9,054,383 B2 | 6/2015 | Roev | |
| 9,306,213 B2 | 4/2016 | Tsunozaki | |
| 10,033,030 B1 | 7/2018 | Vajo | |
| 10,608,284 B2 | 3/2020 | Rustomji | |
| 2012/0021303 A1* | 1/2012 | Amendola | H01M 12/08 429/406 |
| 2012/0183853 A1 | 7/2012 | Chu | |
| 2013/0302688 A1 | 11/2013 | Takezawa | |
| 2017/0077564 A1* | 3/2017 | Wang | C01G 53/50 |
| 2017/0110701 A1 | 4/2017 | Shi | |
| 2018/0006306 A1* | 1/2018 | Zhu | H01M 4/5825 |
| 2018/0261842 A1* | 9/2018 | Park | H01M 10/0525 |
| 2019/0372104 A1* | 12/2019 | Nose | H01M 4/364 |

FOREIGN PATENT DOCUMENTS

EP 3118916 B1 10/2019

OTHER PUBLICATIONS

International Search Report for related Intl. Appl. Ser. No. PCT/US2022/070632, dated Apr. 14, 2022.

* cited by examiner

*Primary Examiner* — Cynthia H Kelly
*Assistant Examiner* — Monique M Wills
(74) *Attorney, Agent, or Firm* — Raven Patents, LLC; Anton E Skaugset (57) ABSTRACT

Methods of manufacturing cathode active materials, including preparing a solution of a hygroscopic species and a reactive oxygen species, heating the solution at a temperature that is less than about 400° C. for a time sufficient for a precipitate of the cathode active material to form, and collecting the cathode active material. The cathode active materials can be used to prepare cathodes that evolve little or no oxygen during operation. The cathodes can be economically incorporated into batteries that can provide high energy density.

17 Claims, 6 Drawing Sheets

HIGH-ENERGY CATHODES, BATTERIES, AND METHODS OF MAKING THE SAME

TECHNICAL FIELD

This disclosure relates to a cathode active material, methods of manufacturing the cathode active material, cathodes that include the cathode active material, and batteries that incorporate such cathodes.

BACKGROUND

Batteries are ubiquitous in modern technology, being used in a wide range of applications from small batteries for industrial and medical devices, to larger batteries for electric vehicles and grid energy storage systems. Perhaps the most well-known and widely-used battery technology at the present are lithium-ion batteries, which use an intercalated lithium compound as one electrode material and employ lithium ions shuttling between the cathode and anode in the pond of electrolyte. While lithium-ion batteries possess many advantages, they provide relatively low energy densities, and may require expensive materials for manufacture.

Lithium-air or lithium-oxygen batteries are considered to be 'next generation' lithium-ion battery technology, and is known to outperform today's lithium-ion batteries in many aspects, such as energy density and the cost of materials. These batteries consume oxygen and generate reactive oxygen species that function as the cathode active material. However, such batteries are prone to oxygen desorption at comparatively low temperatures during operation, and produce electrochemically irreversible byproducts that seriously hinder the rechargeability of the batteries. Such oxygen desorption or reactive oxygen species dissociation may also cause a thermal runaway reaction in the battery.

What is needed is an improved cathode, which incorporates improved cathode active materials, and which can provide greater energy density, more economical manufacturing costs, and lower materials costs, while at the same time exhibiting greater electrochemical reversibility and resistance to oxygen generation during use.

SUMMARY

The disclosure is directed to cathode active materials and their methods of manufacture, as well as cathodes incorporating the cathode active materials, and batteries that incorporate such cathodes.

In one example, the disclosure is directed to methods of manufacturing cathode active materials, where the method includes preparing a solution of a hygroscopic species and a reactive oxygen species; heating the solution at a temperature that is less than about 400° C. for a time sufficient for a precipitate of the cathode active material to form; collecting the cathode active material; and drying the collected cathode active material at a temperature that is less than about 400° C.

In another example, the disclosure is directed to methods of manufacturing cathodes for batteries, where the method includes preparing a solution of a hygroscopic species and a reactive oxygen species; heating the solution at a temperature that is less than about 400° C. for a time sufficient for a precipitate of the cathode active material to form; collecting the cathode active material; drying the collected cathode active material at a temperature that is less than about 400° C.; combining the cathode active material with one or more of an electrically-conductive material, and a polymeric binder; and depositing the combined cathode material on a current collector to create the cathode.

In another example, the disclosure is directed to cathode active materials for use in cathodes of batteries, where the cathode active materials include a reactive oxygen species derivative, a reactive oxygen species derivative combined with a hygroscopic species, or a reactive oxygen species combined with a hygroscopic species, where a cathode prepared using the cathode active material evolves substantially zero gaseous oxygen during operation in the battery.

The disclosed features, functions, and advantages of the disclosed methods, cathode active materials, cathodes, and batteries may be achieved independently in various embodiments of the present disclosure, or may be combined in yet other embodiments, further details of which can be seen with reference to the following description and drawings.

DETAILED DESCRIPTION

The present disclosure provides high energy density cathode active materials, which may be produced inexpensively, and can be used to prepare cathodes for use in batteries. Selected cathodes prepared according to the present disclosure evolve substantially no gaseous oxygen during operation of a battery that includes the cathode.

In some aspects, cathodes prepared according to the present disclosure evolve gaseous oxygen at a rate of less than about 1 mg per 1 mAh during a full lifecycle of a battery that includes the cathode. As used herein, the term "full lifecycle of the battery" is intended to mean that the life of the battery is considered to have exceeded its normal useful life, which is assumed here to be the point at which the battery shows 80% of its original capacity for the first time.

Figure 1:
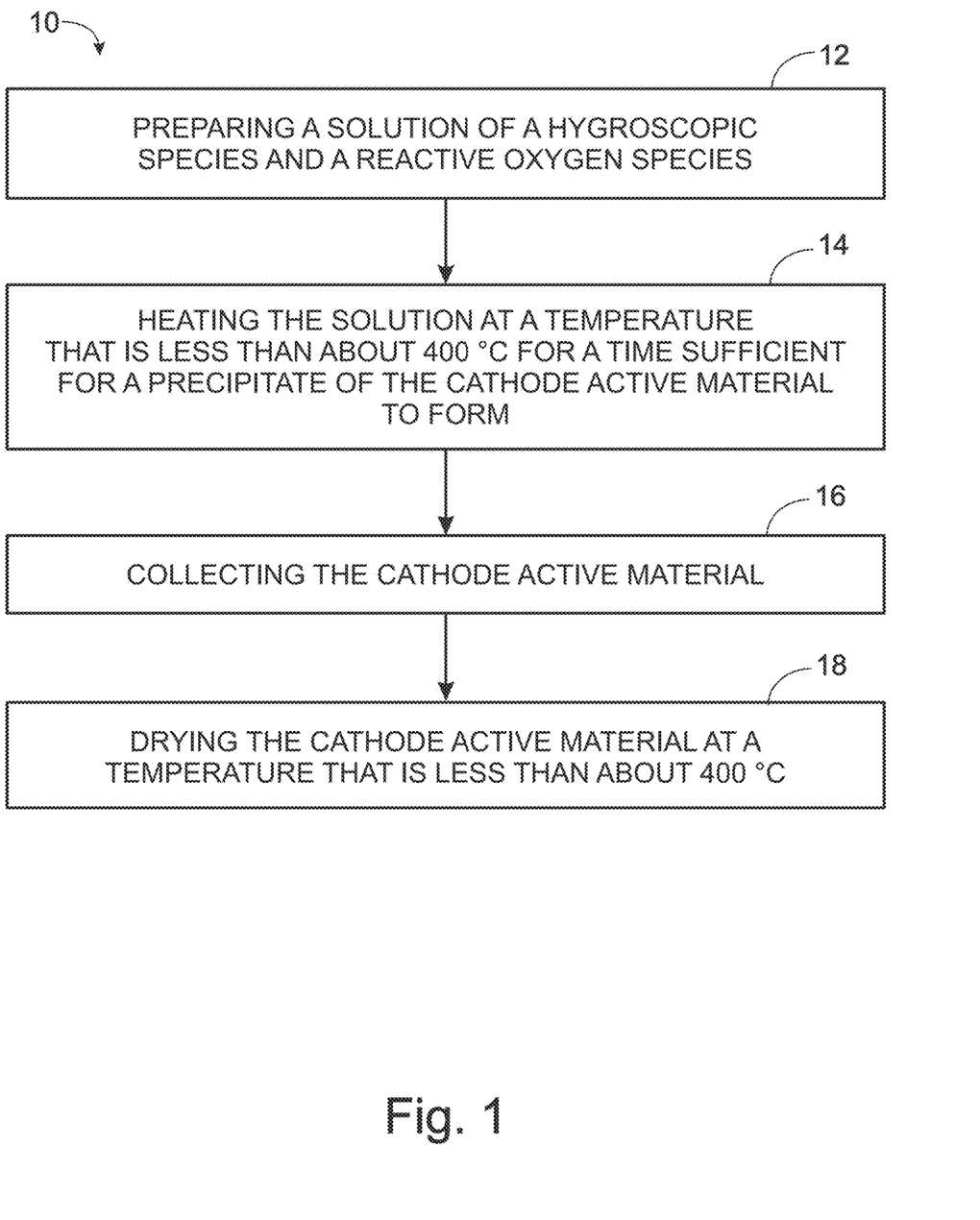
FIG. 1 is a flowchart of an illustrative method of manufacturing a cathode active material according to the present disclosure.

An illustrative method of manufacturing a high energy cathode active material according to the present disclosure is depicted in flowchart 10 of FIG. 1. The method includes preparing a solution of a hygroscopic species and a reactive oxygen species, at step 12 of flowchart 10; heating the solution at a temperature that is less than about 400° C. for a time sufficient for a precipitate of the cathode active material to form, at step 14 of flowchart 10; collecting the cathode active material, at step 16 of flowchart 10; and drying the collected cathode active material at a temperature that is less than about 400° C., at step 18 of flowchart 10. The precipitate can be a reactive oxygen species derivative, a reactive oxygen species derivative combined with the hygroscopic species, or a reactive oxygen species combined with the hygroscopic species.

The hygroscopic species used to prepare the cathode active material can be any hygroscopic species that forms a precipitate when heated with an appropriate reactive oxygen species in a solution. Typically, the hygroscopic species is a compound or substance that attracts water from its environment, either by chemical reaction, by incorporating water of hydration, or by physical adsorption. In particular, the hygroscopic species should be substantially free of transition metals. Particularly useful hygroscopic materials can include one or more ionic compounds and/or one or more organic compounds.

Where the hygroscopic species includes one or more ionic compounds, the ionic compounds are typically salts, and more typically chloride, bromide, pentoxide, sulfide, sulfate salts. The ionic compound can also be an acid capable of donating a proton.

Where the hygroscopic species includes one or more organic compounds, the organic compounds can be selected from those organic compounds that incorporate one or more nitrogen or oxygen atoms. For example, the one or more organic compounds can be selected from among truxenone, truxenone derivatives, phenoxazine, phenoxazine derivatives, phenothiazine, phenothiazine derivatives, quinone, quinone derivatives, diamine derivatives, phenazine, phenazine derivatives, quinoxaline, quinoxaline derivatives, pyrazine, pyrazine derivatives, triazine, triazine derivatives, dimethoxybenzene, dimethoxybenzene derivatives, cyclopropenium derivatives, and amide derivatives.

The reactive oxygen species can be any species that includes one or more reactive oxygen moieties. For example, the reactive oxygen species can include one or more reactive oxygen moieties such as peroxides, superoxides, superoxide radicals, hydroxyl radicals, peroxyl radicals, perhydroxyl radical, hydroperoxyl radicals, alkoxyl radicals, singlet oxygen, hypochlorous acid, and alpha-oxygen. In one embodiment of the present disclosure, the reactive oxygen species includes at least one peroxide moiety. In an alternative embodiment, the reactive oxygen species can include one or more of $Li_2O_2$, $H_2O_2$, HOCl, and $^1O_2$.

Upon reaction, the reactive oxygen species is typically converted to a reactive oxygen species derivative. The reactive oxygen species derivative can be any species that is derived from the reactive oxygen species, and can be distinguished from the reactive oxygen species in that the reactive oxygen species derivative no longer includes a reactive oxygen moiety such as a peroxide, superoxide, superoxide radical, hydroxyl radical, peroxyl radical, perhydroxyl radical, hydroperoxyl radical, alkoxyl radical, singlet oxygen, hypochlorous acid, and alpha-oxygen.

Any method of preparing the solution of the hygroscopic species and reactive oxygen species is a suitable method for the purposes of the method of flowchart 10. For example, preparing a solution of the one or more hygroscopic species and the one or more reactive oxygen species can include the addition of each of the desired hygroscopic species and reactive oxygen species to a single solution to form the desired combined solution. Alternatively, one or both of the hygroscopic species and reactive oxygen species can be initially dissolved in a solvent, and the hygroscopic species solution and the reactive oxygen species solution can then be combined to form the combined solution, or both can be added to an existing solution to form the combined solution.

The resulting solution is then heated at a temperature that is less than about 400° C., but high enough to result in formation of a precipitate of the desired cathode active material. It should be appreciated that it is normally not possible to heat a solution to temperatures higher than the boiling point of the solution under standard conditions, and so the combined solution should be transferred to a sealed vessel, or autoclave, for heating under elevated pressure. The atmosphere of the sealed vessel, or autoclave can be replaced with high purity oxygen gas during the heat treatment.

When the combined solution has been heated for a time sufficient for a precipitate of the cathode active material to formed, the cathode active material can be collected. Any appropriate separation method can be used to collect the cathode active material precipitate, but typically the precipitate mixture is filtered, and washed. Included in the step of collecting the cathode active material, the filtered and washed cathode active material can be dried under vacuum or under an inert gas atmosphere, typically at a temperature less than about 400° C.

Testing or further handling of the collected and dried cathode active material should be done under dry conditions, for example in a relative humidity of less than about 25%. Preferably, such handling would be performed in a dry room.

Figure 2:
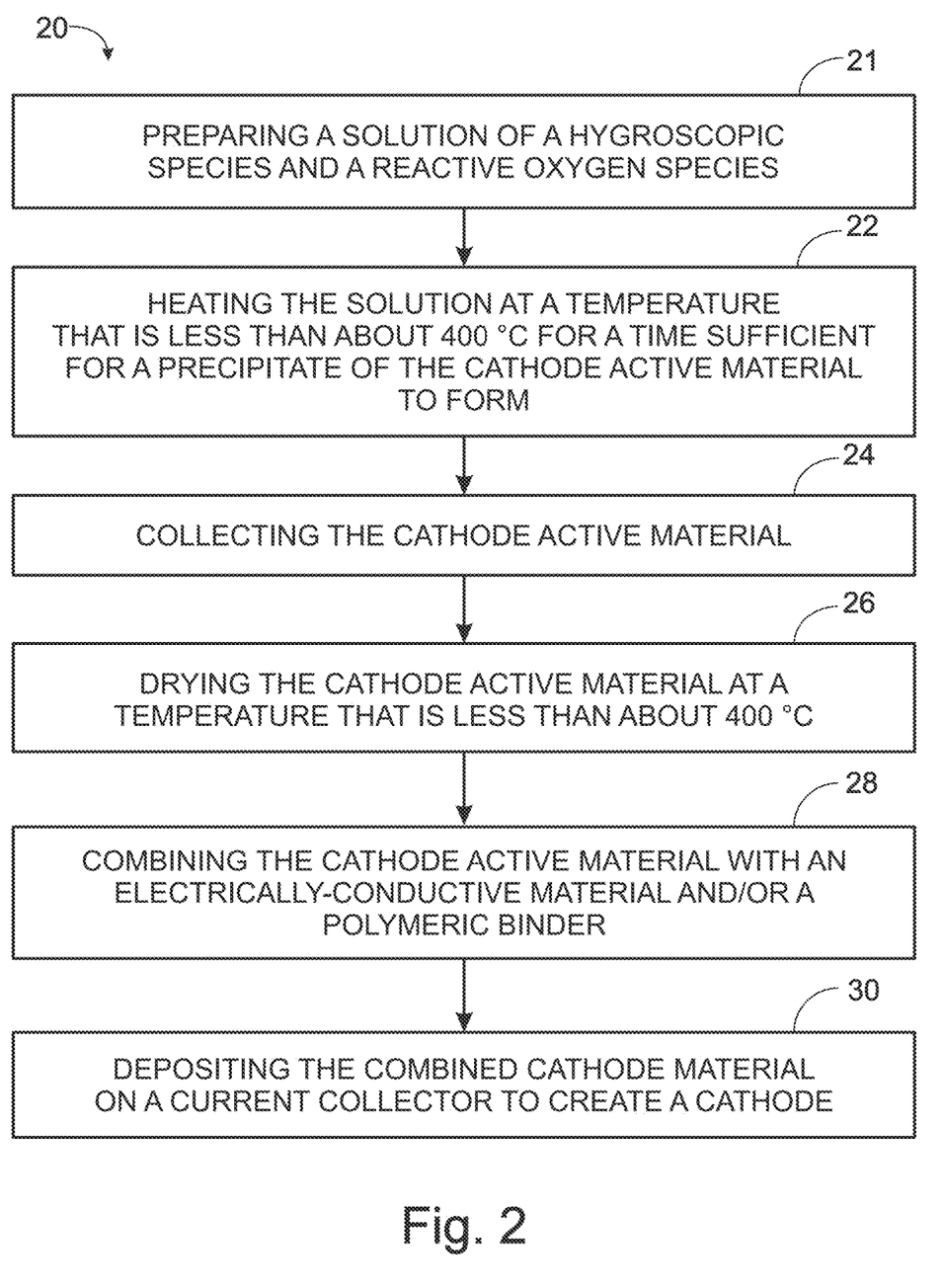
FIG. 2 is a flowchart of an illustrative method of manufacturing a cathode according to the present disclosure.

The cathode active materials disclosed herein can be used to prepare high energy cathodes, as set out in flowchart 20 of FIG. 2. As shown, the method of manufacturing a cathode for use in a battery includes preparing a solution of a hygroscopic species and a reactive oxygen species, at step 21 of flowchart 20; heating the solution at a temperature that is less than about 400° C. for a time sufficient for a precipitate of the cathode active material to form, at step 22 of flowchart 20; collecting the cathode active material, at step 24 of flowchart 20; drying the collected cathode active material at a temperature that is less than about 400° C., at step 26 of flowchart 20; combining the collected cathode active material with one or more of an electrically-conductive material and a polymeric binder, at step 28 of 20 flowchart 20; and depositing the combined cathode material on a current collector to create the cathode, at step 30 of flowchart 20.

Steps 21, 22, 24, and 26 of flowchart 20 are directly analogous to corresponding steps 12, 14, 16, and 18 of flowchart 10, as described above.

As set out in step 28 of flowchart 20, the cathode active material can be combined with an electrically-conductive material, a polymeric binder, or both.

Where the cathode includes an electrically-conductive material, it can be added to one of the hygroscopic species or reactive oxygen species prior to preparation of the cathode active material, or the cathode active material can be combined with an electrically-conductive material after it is formed. In general, the cathode active material is in contact with the electrically-conductive material. In one embodiment, the cathode includes the cathode active material that is coated with an electrically-conductive material.

Any electrically-conductive material that facilitates the performance of the resulting cathode is a suitable electrically-conductive material for the purposes of the present disclosure. In some embodiments, the electrically-conductive material includes a porous carbon material that is, or includes, one or more of carbon black, carbon nanotubes, carbon nanofibers, carbon dots, activated carbon, amorphous carbon, microporous carbon, mesoporous carbon, porous carbon, graphite, graphene, graphene oxide, graphene nanoribbons, nitrogen-doped carbon, nitrogen-doped graphene, and nitrogen-doped graphene oxide. The electrically-conductive material can have any suitable and compatible physical form, such as particles, powders, paper, foam, fibers, sheets, discs, rods, foils, or any combination thereof. In one embodiment, the electrically-conductive material includes a porous carbon material having particles with an average particle size of about 50 nm to about 50 µm, and exhibiting a pore size of about 0.1 nm to about 1 µm.

In one embodiment, the step of combining the cathode active material with an electrically-conductive material includes combining the cathode active material with a porous carbon material that includes one or more of carbon black, carbon nanotubes, carbon nanofibers, carbon dots, activated carbon, graphene, graphene oxide, and graphene nanoribbons.

Where the cathode includes a polymeric binder, it can be added to one of the hygroscopic species or reactive oxygen species prior to preparation of the cathode active material, or the cathode active material can be combined with a polymeric binder after it is formed.

The polymeric binder can be added in order to help form a solid cathode from the cathode active material. An appropriate polymeric binder for the purposes of this disclosure can include one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, among others. In a particular embodiment, the polymeric binder includes poly(ethylene oxide) (PEO).

Alternatively, or in addition, the cathode can incorporate a plasticizer, which can be used to make the resulting cathode softer and more flexible. The plasticizer can include one or more of succinonitrile, glutaronitrile, adiponitrile, ethylene carbonate, sulfolane, 3-methyl-2-oxazolidinone, butylene carbonate, phthalate derivatives, trimellitates, adipates, sebacates, and maleates, among others.

As set out at step 30 of flowchart 20, the combined cathode material, including cathode active material and optionally including one or more of a conductive material, a polymeric binder, and a plasticizer, is deposited on a current collector in order to form the desired cathode.

The current collector can include any suitable and compatible conductive material. In some embodiments, the cathode current collector includes one or more metals such as alkaline earth metals, transition metals, rare earth metals, post-transition metals, and alkali metals. In some embodiments, the cathode current collector includes at least one of aluminum, aluminum alloy, nickel, nickel alloy, duplex steel, stainless steel. In one embodiment, the cathode current collector is a metallic current collector that includes a metal or metal alloy that in turn includes one or more of molybdenum, titanium, and zirconium. In an alternative embodiment, the cathode current collector is an electrically-conductive material that includes porous carbon in electrical contact with the cathode active material.

The cathode current collector can be solid or perforated. When perforated, the pore size of the cathode current collector can vary from about 500 nm to about 1 mm, with a separation distance between pores of about 10 µm to about 100 mm.

The cathode material, with additional conductive materials, polymeric binder, and plasticizers, if present, can be applied to the current collector using any suitable application technique. For example, the combined cathode material can be cast into a film and deposited onto the desired current collector.

Figure 3:
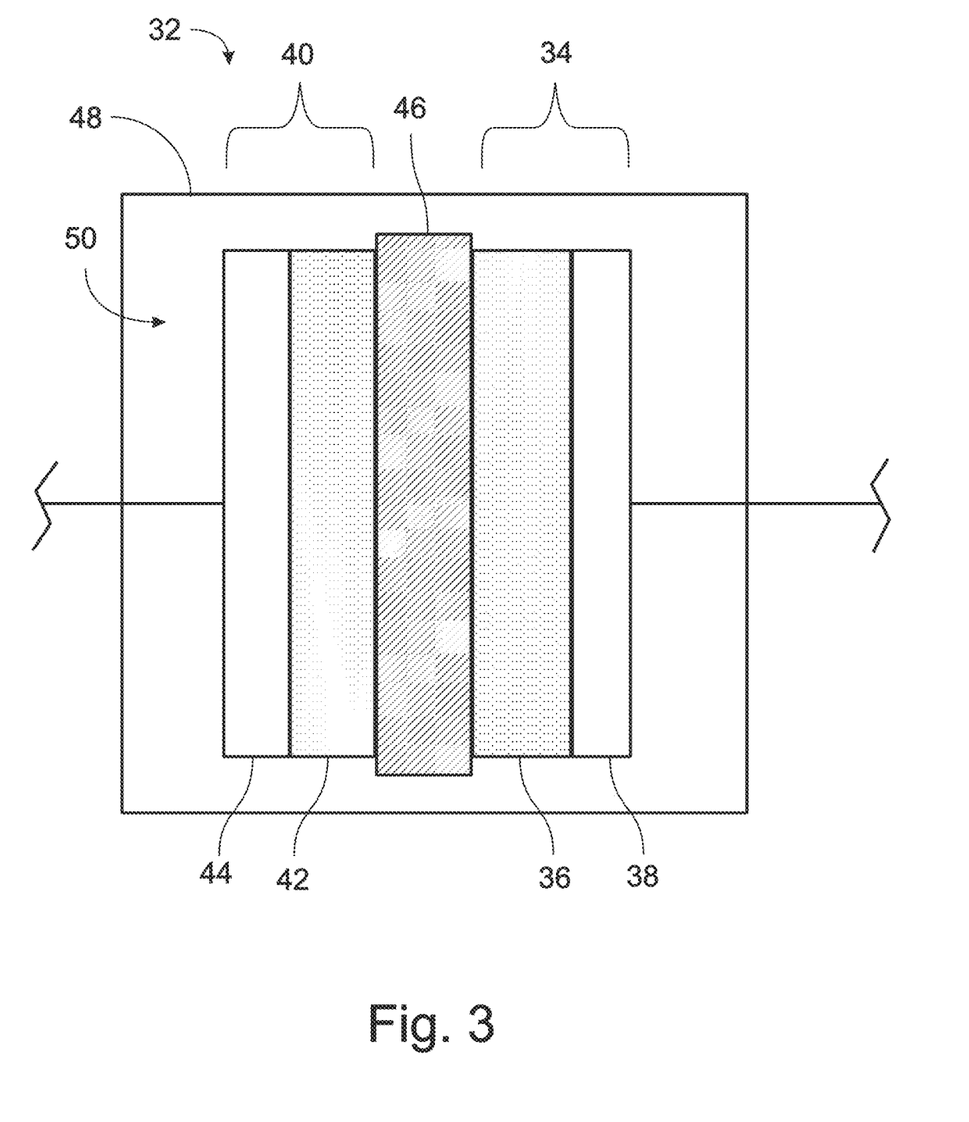
FIG. 3 is a semi-schematic diagram of an illustrative battery that includes a cathode manufactured according to the present disclosure.

The resulting cathode can be incorporated into a battery 32, as shown in FIG. 3. Battery 32 typically includes a cathode 34 according to the present disclosure. Cathode 34 includes the combined cathode material 36 as described above, including the cathode active material, applied to a cathode current collector 38. The anode 40 of battery 32 includes an anode material 42 applied to an anode current collector 44. The cathode 34 and anode 40 are typically separated by an electrolytic separator 46. The battery components are typically held within a battery case 48, which encloses the battery components, and can keep the battery components under a desired gas composition or atmosphere 50.

Anode 40 can include an anode active material. In some embodiments, the anode includes one or more of lithium, sodium, potassium, magnesium, calcium, vanadium, aluminum, zinc, silicon, graphite, graphene, porous carbon, activated carbon, silicon compound, a metal oxide, and combinations thereof. The anode active material can be present as a coating, a foil, a mesh or screen, or other discrete anode component.

Alternatively, or in addition, the anode active material can be incorporated into the anode as a component element, or component compound. In some embodiments, anode 40 includes a non-metal oxide as an anode active material. In some embodiments, the anode includes a non-metal oxide such as silicon, a form of silicon, graphite, graphene, porous carbon, activated carbon, or combinations thereof. In some embodiments, the anode includes a metal oxide. In some embodiments, the anode includes a metal oxide such as $Li_4Ti_5O_{12}$, $TiO_2$, $TiNb_2O_7$, $Nb_2O_5$, $Li_3VO_4$, $H_2Ti_6O_{13}$, $LiMnBO_3$, $LiV_{0.5}Ti_{0.5}S_2$, $Li_3V_2O_5$, $Li^{3+}_xV_2O_5$, $Li_3MoO_4$, $Li_5W_2O_7$, or any combination thereof.

Anode 40 typically includes a coating layer that is coating an outer surface of the anode material 42, where the coating layer includes carbon and oxygen.

Anode current collector 44 can include a metal or metal alloy, such as copper, a copper alloy, nickel, a nickel alloy, duplex steel, stainless steel, silver, a silver alloy, or any combination thereof. In some embodiments. The anode current collector 44 can be in contact with (e.g., coated with) an electrically-conductive material, such as a porous carbon material that is or includes carbon black, carbon nanotubes, carbon nanofibers, carbon dots, activated carbon, amorphous carbon, microporous carbon, mesoporous carbon, porous carbon, graphite, graphene, graphene oxide, graphene nanoribbons, nitrogen-doped carbon, nitrogen-doped graphene, nitrogen-doped graphene oxide, and combinations thereof. In some embodiments, the electrically-conductive material is in the form of particles, powders, paper, foam, fibers, sheets, discs, rods, foils, or any combination thereof.

In some embodiments, battery 32 can be a so-called "anode-free" battery, where anode 40 includes anode current collector 44, but no anode material 42. In such embodiments, anode current collector 44 may be disposed on or in the electrolyte such that the electrolyte is between cathode 34 and anode current collector 44. Alternatively, or in addition, anode current collector 44 can be or include an exterior housing of the battery (i.e., battery case 48).

Electrolytic separator 46 is disposed between cathode 34 and anode 40, and typically includes an electrolyte to provide for ion transport within battery 32, and act as a conduit for ion transport through its interaction with the anode material 42 and the cathode material 36. Electrolytic separator 46 can be in contact with the electrolyte, and can include a polymer film (such as polyethylene, polypropylene, poly(tetrafluoroethylene), or poly(vinyl chloride), among others), nonwoven fibers (such as nylon, polyesters, and glass, among others), a glass, a ceramic, or any combination thereof. In some embodiments, the separator includes glass fibers. In some embodiments, the separator includes a surfactant coating or treatment to enhance the wettability of a liquid-based electrolyte.

The electrolyte present in battery 32 can include a solid electrolyte, liquid electrolyte, a liquefied gaseous electrolyte, or any combination thereof. In some embodiments, the electrolyte is an aqueous electrolyte. Alternatively, the electrolyte can include a nitrogen-containing compound, where the nitrogen-containing compound can include one or more of dimethylformamide (DMF), diethylformamide (DEF), dimethylacetamide (DMAC), dipropylacetamide (DPAC), diethylacetamide (DEAC), dimethylpropionamide (DMP), diethylpropionamide (DEP), 2,2,2-trifluorodimethylacetamide (FDMA), 3-methoxypropionitrile (MPN), methoxyacetonitrile (MAN), acetonitrile (ACN), valeronitrile (VN), succinonitrile (SN), glutaronitrile, adiponitrile, acrylonitrile, propionitrile, tolunitrile, methoxybenzonitrile, malononitrile, or any combination thereof.

Alternatively, or in addition, the electrolyte can include one, two, three, or more carbonate compounds, or compounds including an amide functional group. Suitable carbonate compounds include ethylene carbonate (EC), diethyl carbonate (DEC), dimethyl carbonate (DMC), ethyl methyl carbonate (EMC), propylene carbonate (PC), dipropyl carbonate (DPC), fluoroethylene carbonate (FEC), or any combination thereof.

The electrolyte can optionally include a plasticizer, such as succinonitrile, glutaronitrile, adiponitrile, ethylene carbonate, sulfolane, 3-methyl-2-oxazolidinone, butylene carbonate, phthalate derivatives, trimellitates, adipates, sebacates, maleates, or any combination thereof.

In addition, the electrolyte of electrolytic separator 46 and/or atmosphere 50 can include a greenhouse gas. When present in the electrolyte, the greenhouse gas can be dissolved or liquified greenhouse gas. The term "greenhouse gas" typically refers to a gas that absorbs and emits radiant energy within the thermal infrared range. Non-exclusive examples of greenhouse gases include carbon dioxide ($CO_2$), methane ($CH_4$), nitrous oxide ($N_2O$), ozone ($O_3$), tetrafluoromethane ($CF_4$), hexafluoroethane ($C_2F_6$), sulfur hexafluoride ($SF_6$), carbon tetrachloride ($CCl_4$), sulfur hexafluoride ($SF_6$), nitrogen trifluoride ($NF_3$), hydrofluorocarbons, chlorofluorocarbons, and perfluorocarbons, among others.

Where a greenhouse gas is dissolved in a liquid electrolyte, the greenhouse gas can be introduced via an apparatus that includes a pressure gauge, a gas inlet, a gas outlet, and a chemically resistant frit or foam submerged in the liquid electrolyte. The liquid electrolyte can be kept under a greenhouse gas atmosphere at a pressure above standard atmospheric pressure for at least 10 seconds to at least 100 seconds, or longer. It should be appreciated that while the descriptions of the various embodiments herein are written in the context of a battery having a single cell, the same or similar principles may be applied to a battery assembly that includes more than one battery cell (i.e., battery packs, etc.). Such multiple-battery assemblies should be understood to fall within the scope of the present disclosure.

Example 1. Manufacture of a High Energy Cathode

Cathodes according to the present disclosure are manufactured and tested using the following procedures.

Lithium hydroxide (LiOH) monohydrate and lithium chloride (LiCl) hydrate are dissolved in a 1:4 oxalic acid (OA)-methanol (MeOH) mixture with vigorous stirring to prepare a 0.1 M LiOH/0.1 M LiCl solution. 100 mg of carbon nanotube (CNT) is added to the solution with stirring, and the resulting mixture was ultrasonicated for 10 minutes to cause the carbon nanotube to interweave. A solution of hydrogen peroxide ($H_2O_2$) and carbamide peroxide ($CH_6N_2O_3$) was added dropwise to the reaction mixture at a temperature of 65° C., with vigorous stirring. The molar ratio of the components of the reaction mixture was $H_2O_2:CH_6N_2O_3:LiOH:LiCl=1:1:1:1$.

The reaction mixture is then transferred to a TEFLON-lined stainless-steel autoclave and heated to 130° C. for 12 hours. The resulting precipitate is separated from the mother liquor by filtration, washed with methanol and dried under vacuum at 110° C. for 24 hours. The collected material is then quickly transferred to an argon-filled glovebox with minimal exposure to air, and mixed with porous carbon, succinonitrile as a plasticizer, and polytetrafluoroethylene as a polymeric binder. The resulting mixture is cast onto a 316L stainless-steel mesh current collector, with a wire diameter of 0.05 mm and apertures of 0.08 mm to yield the high energy cathode.

The prepared cathode is placed in a coin cell (CR2032) with lithium metal foil as an anode and a polypropylene separator wetted with an electrolyte solution of 0.5 M bistrifluoro-methanesulfonimidate (LiTFSI)/0.5 M lithium nitrate ($LiNO_3$) in FEC-DMAC (1:1 volume ratio). The electrolyte solution was stored for 7 days under $CO_2$ atmosphere at above 5 bar of pressure before use.

Example 2. Determining the Charge-Discharge Profile of the High Energy Battery

The high energy battery prepared in Example 1 is subjected to cyclic charge-discharge by applying constant current to the battery. The high capacity performance of the battery is demonstrated in the plot of FIG. 4, which is a plot of charge discharge profile with voltage (V versus Li/Li+) versus specific capacity (mAh/g).

Figure 4:
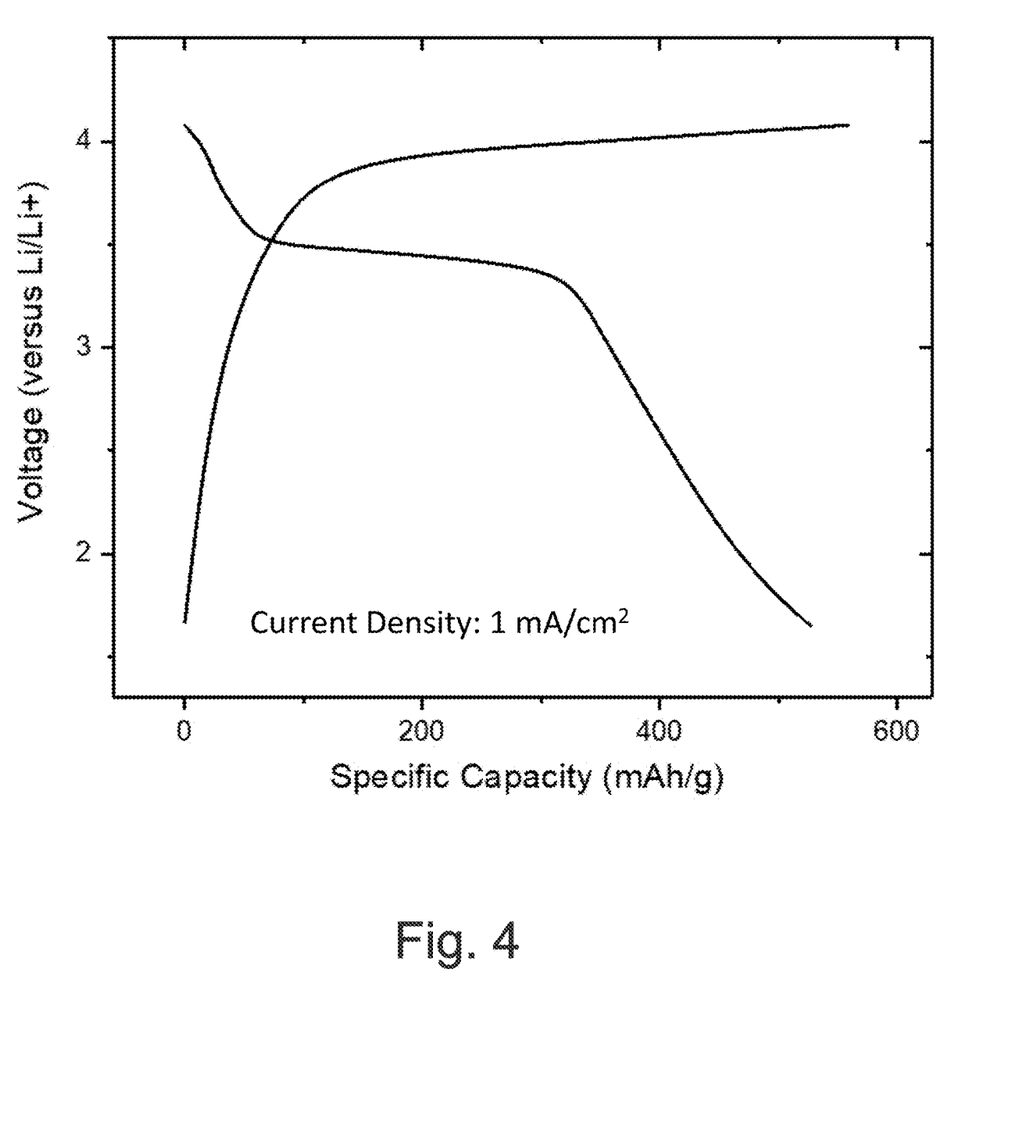
FIG. 4 is a plot demonstrating the high specific capacity and high voltage performance of an illustrative battery that incorporates cathode active material according to the present disclosure, as described in Example 2.

As shown, the battery of Example 1 achieves a specific capacity of over 500 mAh/g based on the weight of the cathode active material at a current density of 1 mA/cm². The plot also demonstrates a high operating average discharge voltage of 3.41 V with a clear discharge plateau at around 3.48 V. Furthermore, the absence of any indication of an oxygen reduction reaction at around 2.5V shows that the cathode active material does not evolve gaseous oxygen during charging.

Example 3. Determining the Rechargeability of the High Energy Battery

Figure 5:
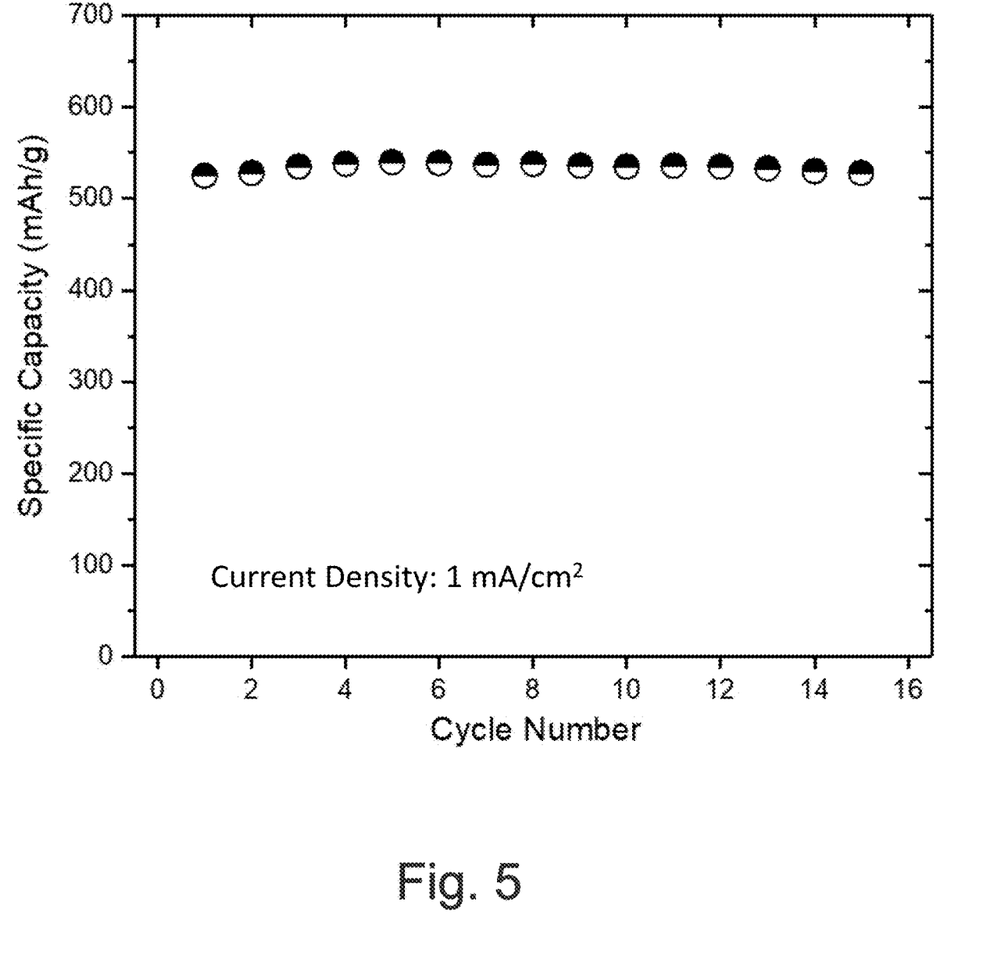
FIG. 5 is a plot demonstrating the advantageously high rechargeability of an illustrative battery that incorporates cathode active material according to the present disclosure, as described in Example 3.

The high energy battery prepared in Example 1 is subjected to repeated discharge and recharge. As shown in FIG. 5, the battery maintained a high capacity over 15 cycles at a current density of 1 mA/cm².

Example 4. Specific Capacity Comparison

Figure 6:
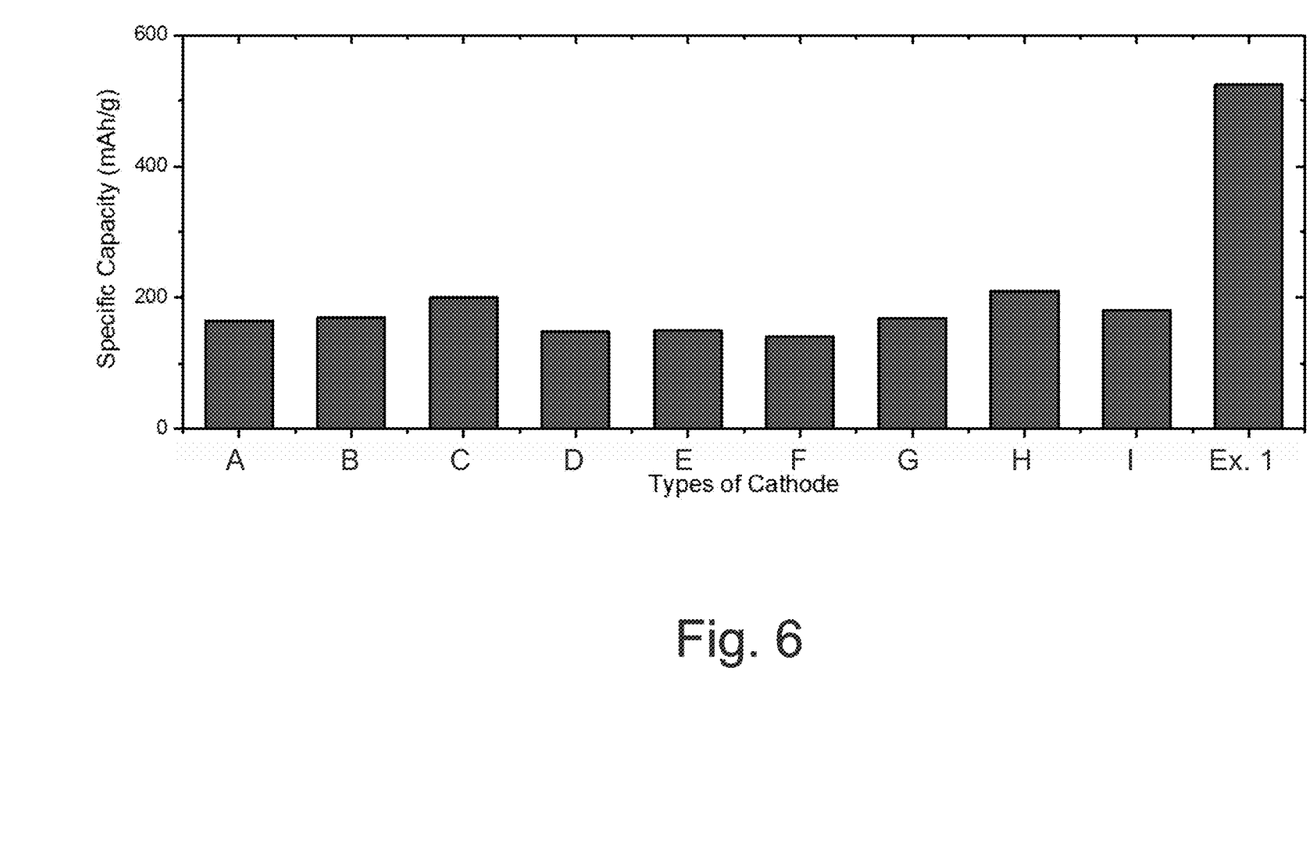
FIG. 6 is a bar graph comparing the specific capacities of selected battery cathode materials in comparison with a cathode prepared according to the present disclosure, as described in Example 4.

The specific capacity of the cathode materials prepared in Example 1 is compared to the specific capacities of conventional lithium-ion batteries with metal oxide cathodes. As shown in FIG. 6, as cathode prepared as in Example 1 exhibits a higher practical specific capacity than conventional lithium-ion batteries with metal oxide cathodes selected from LiFePO$_4$ (A), LiNi$_x$Mn$_y$Al$_z$O$_2$ (B), LiNi$_x$Co$_y$-Al$_z$O$_2$ (C), LiCoO$_2$ (D), LiNiO$_2$ (E), LiMnO$_2$ (F), LiMnPO$_4$ (G), LiTiS$_2$ (H), and Li$_2$MnO$_3$ (I) (values for conventional battery compositions shown in the graph taken from publicly-available literature (see https://doi.org/10.1016/j.mattod.2014.10.040).

Example 5. Additional Selected Embodiments

This section describes additional aspects and features of the disclosed methods, cathode active materials, cathodes, and batteries presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A cathode active material for a battery, manufactured using a reactive oxygen species and a transition metal-free hygroscopic species, wherein the cathode active material is not intended to evolve gaseous oxygen during operation of the battery.

A2. The cathode active material of paragraph A1, comprising the reactive oxygen species and the transition metal-free hygroscopic species.

A3. The cathode active material of paragraph A1, the cathode active material exhibiting at least 500 mAh/g of discharge capacity at a current density of greater than or equal to 1 mA/cm$^2$.

A4. The cathode active material of paragraph A1, the cathode active material exhibiting at least 3.0V of average operating discharge voltage at a current density of greater than or equal to 1 mA/cm$^2$.

A5. The cathode active material of paragraph A1, wherein the reactive oxygen species includes peroxide, superoxide radical, hydroxyl radical, peroxyl radical, perhydroxyl radical, hydroperoxyl radical, alkoxyl radical, singlet oxygen, hypochlorous acid, alpha-oxygen and combinations thereof.

A6. The cathode active material of paragraph A1, wherein the transition metal-free hygroscopic species includes a halide ion, wherein the halide ion is selected from the group consisting of I$^-$, Br$^-$, C$^-$, and F$^-$.

A7. The cathode active material of paragraph A1, wherein the transition metal-free hygroscopic species includes an organic material containing an oxygen atom and/or a nitrogen atom.

A8. The cathode active material of paragraph A7, wherein the organic material is electroactive.

A9. The cathode active material of paragraph A1, wherein the transition metal-free hygroscopic species have solubility of more than 0.1 g per 100 mL of water A10. The cathode active material of paragraph A1, wherein the cathode active material evolves less than 1 mg per 1 mAh of gaseous oxygen during the full lifecycle of a battery that includes a cathode prepared with the cathode active material.

A11. The cathode active material of paragraph A1, wherein the cathode active material evolves less than 1 mg per 1 Ah of gaseous oxygen during the full lifecycle of a battery that includes a cathode prepared with the cathode active material.

A12. The cathode active material of paragraph A1, wherein the cathode active material is in contact with a plasticizer.

A13. The cathode active material of paragraph A1, wherein the cathode active material is incorporated into a cathode that is a component of a battery.

A14. The cathode active material of paragraph A13, wherein the battery further comprises an electrolyte that is in contact with a greenhouse gas, wherein the greenhouse gas is liquified, in contact with, or dissolved in the electrolyte.

A15. The cathode active material of paragraph A14, wherein the greenhouse gas includes carbon dioxide (CO$_2$), methane (CH$_4$), tetrafluoromethane (CF$_4$), hexafluoroethane (C$_2$F$_6$), sulfur hexafluoride (SF$_6$), carbon tetrachloride (CCl$_4$), one or more perfluorocarbons, one or more chlorofluorocarbons, one or more hydrofluorocarbons, or a combination thereof.

A16. The cathode active material of paragraph A15, wherein the electrolyte comprises a compound containing a nitrogen atom.

A17. The cathode active material of paragraph A13, wherein the cathode includes a cathode current collector in contact with the cathode.

A18. The cathode active material of paragraph A17, wherein the cathode current collector includes a metal alloy having at least one material selected from the group consisting of molybdenum, titanium, zirconium, and combinations thereof.

B1. A method for manufacturing a cathode active material, comprising: providing a solution containing a transition metal-free hygroscopic species; providing another solution containing a reactive oxygen species; combining the solutions and heating the combination at a temperature of less than 400° C.

B2. The method of paragraph B1, wherein the transition metal-free hygroscopic species includes a halide ion, wherein the halide ion is selected from the group consisting of I$^-$, Br$^-$, C$^-$, and F$^-$.

B3. The method of paragraph B1, wherein the transition metal-free hygroscopic species comprise an organic material containing an oxygen atom and/or a nitrogen atom.

B4. The method of paragraph B3, wherein the organic material is electroactive.

B5. The method of paragraph B1, wherein the reactive oxygen species comprise peroxide, superoxide radical, hydroxyl radical, peroxyl radical, perhydroxyl radical, hydroperoxyl radical, alkoxyl radical, singlet oxygen, hypochlorous acid, alpha-oxygen or a combination thereof.

B6. The method of paragraph B1, further comprising adding an electrically-conductive material into the combined solution.

B7. The method of paragraph B6, wherein the electrically-conductive material is selected from the group consisting of carbon black, carbon nanotubes, carbon nanofibers, carbon dots, activated carbon, graphene, graphene oxide, graphene nanoribbons, and combinations thereof.

C1. A cathode active material for a battery, comprising a reactive oxygen species and a transition metal-free hygroscopic species, wherein the cathode active material evolves substantially zero gaseous oxygen during operation of the battery.

D1. A cathode active material for a battery, comprising a reactive oxygen species and an organic compound, wherein the organic compound incorporates a nitrogen or an oxygen atom, and wherein the cathode active material evolves substantially zero gaseous oxygen during operation of the battery.

E1. A cathode active material for a battery, comprising a reactive oxygen species and a halogenated compound, and wherein the cathode active material does not evolve gaseous oxygen during operation of the battery.

F1. A cathode active material for a battery, comprising a reactive oxygen species and a chlorinated compound, and wherein the cathode active material does not evolve gaseous oxygen during operation of the battery.

G1. A cathode active material for a battery, comprising a reactive oxygen species derivative, a reactive oxygen species combined with a hygroscopic species or a reactive oxygen species derivative combined with a hygroscopic species, and wherein the cathode active material evolves substantially zero gaseous oxygen during operation of the battery.

H1. A cathode active material for a rechargeable battery, comprising a reactive oxygen species derivative comprising a metal compound having the formula $M_xCl_yO_z$ (i.e., $LiClO_2$, $LiClO$, $LiClO_3$, $Li_3ClO$, $Li_2ClO_2$, $Li_3ClO_2$, $Li_{17}Cl_5O_6$, $Li_5Cl_3O$, $LiCl_2O_4$, $LiClO_7$). I1. A cathode active material for a rechargeable battery, comprising a reactive oxygen species derivative comprising a metal, oxygen, chlorine, and an amide functional group.

Advantages, Features, Benefits

The cathode active materials of the present disclosure permit the fabrication of high energy cathodes for batteries that are economical, provide high discharge capacities, high discharge potentials, and are not subject to oxygen evolution during operation.

Selected batteries of the present disclosure exhibit discharge capacities of at least 500 mAh/g at a current density of greater than or equal to 0.1 mA/cm². In addition, such batteries can produce at least 3.0 V of average operating discharge potential at a current density of greater than or equal to 0.1 mA/cm².

Cathodes prepared according to the methods of the present disclosure can operate with an evolution of less than 1 mg per 1 mAh of gaseous oxygen during a full lifecycle of the battery including the cathode. In some cases, the cathodes of the present disclosure exhibit substantially zero evolution of gaseous oxygen during operation.

The cathode active material of the present disclosure exhibits a standard redox potential above 3.0 V versus $Li/Li^+$.

The term "substantially" as used herein means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder. Similarly, the term "about" refers to a deviation of up to 10% of the stated value, if it is physically possible, both downwards and upwards, and otherwise only in the meaningful direction.

Unless related to specific examples, all specifications regarding quantities and portions, particularly those for delimiting the disclosed subject matter, are supposed to indicate a ±10% tolerance, for example: 11% means: from 9.9% to 12.1%. For terms such as "a solvent", the word "a" is not to be regarded as a numerical word but as an indefinite article or as a pronoun, unless the context indicates otherwise.

The term "combination" or "combinations" means, unless otherwise stated, all types of combinations, starting from two of the relevant constituents, to a plurality or all of such constituents.

The illustration of the steps of a method, whether shown in the drawings or described in the description, should not be considered to illustrate the specific order of the method steps, unless the order is specifically provided. The order of such steps may differ from what is depicted and described, and/or two or more steps may be performed concurrently or with partial concurrence, unless specified differently.

The features and variants specified in the individual embodiments and examples can be freely combined with those of the other examples and embodiments and in particular be used to characterize the invention in the claims without necessarily implying the other details of the respective embodiment or the respective example.

CONCLUSION

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing a cathode active material, comprising:
    preparing a solution of a hygroscopic species and a reactive oxygen species, wherein the hygroscopic species includes one or more ionic compounds or organic compounds, wherein each ionic compound includes a chloride, a bromide, a pentoxide, a sulfide, or a sulfate; and wherein the reactive oxygen species includes one or more peroxides, superoxides, superoxide radicals, hydroxyl radicals, peroxyl radicals, perhydroxyl radicals, hydroperoxyl radicals, alkoxyl radicals, singlet oxygen, hypochlorous acid, and alpha-oxygen;
    heating the solution at a temperature that is less than about 400° C. for a time sufficient for a precipitate of the cathode active material to form, wherein the precipitate of the cathode active material includes a reactive oxygen species derivative, the reactive oxygen species derivative combined with the hygroscopic species, or the reactive oxygen species combined with the hygroscopic species;
    collecting the cathode active material; and
    drying the collected cathode active material.

2. The method of claim 1, wherein the hygroscopic species is substantially free of transition metals.

3. The method of claim 1, wherein the hygroscopic species includes one or more organic compounds selected from truxenone, truxenone derivatives, phenoxazine, phenoxazine derivatives, phenothiazine, phenothiazine derivatives, quinone, quinone derivatives, diamine derivatives, phenazine, phenazine derivatives, quinoxaline, quinoxaline derivatives, pyrazine, pyrazine derivatives, triazine, triazine derivatives, dimethoxybenzene, dimethoxybenzene derivatives, cyclopropenium derivatives, and amide derivatives.

4. The method of claim 1, wherein the hygroscopic species includes one or more organic compounds that each independently incorporate one or more nitrogen or oxygen atoms.

5. The method of claim 1, wherein the reactive oxygen species includes at least one peroxide moiety.

6. A cathode active material prepared using the method of claim 1.

7. A method of manufacturing a cathode for a battery, comprising
preparing a solution of a hygroscopic species and a reactive oxygen species, wherein the hygroscopic species includes one or more ionic compounds or organic compounds, wherein each ionic compound includes a chloride, a bromide, a pentoxide, a sulfide, or a sulfate; and wherein the reactive oxygen species includes one or more peroxides, superoxides, superoxide radicals, hydroxyl radicals, peroxyl radicals, perhydroxyl radicals, hydroperoxyl radicals, alkoxyl radicals, singlet oxygen, hypochlorous acid, and alpha-oxygen;
heating the solution at a temperature that is less than about 400° C. for a time sufficient for a precipitate of a cathode active material to form, wherein the precipitate of the cathode active material includes a reactive oxygen species derivative, the reactive oxygen species derivative combined with the hygroscopic species, or the reactive oxygen species combined with the hygroscopic species;
collecting the cathode active material;
drying the collected cathode active material;
combining the cathode active material with one or more of an electrically-conductive material, and a polymeric binder; and
depositing the combined cathode material on a current collector to create the cathode.

8. The method of claim 7, wherein combining the cathode active material with an electrically-conductive material includes combining the cathode active material with a porous carbon material that includes one or more of carbon black, carbon nanotubes, carbon nanofibers, carbon dots, activated carbon, graphene, graphene oxide, and graphene nanoribbons.

9. The method of claim 7, wherein combining the cathode active material with an electrically-conductive material or a polymeric binder further comprises combining the cathode active material with a plasticizer.

10. The method of claim 7, wherein depositing the combined cathode material on the current collector includes depositing the combined cathode material on a metallic current collector that includes one or more of molybdenum, titanium, and zirconium.

11. A battery, including a cathode manufactured according to the method of claim 7, wherein the cathode evolves less than 1 mg per 1 mAh of gaseous oxygen during a full lifecycle of the battery.

12. The battery of claim 11, wherein the cathode evolves substantially zero gaseous oxygen during operation of the battery.

13. The battery of claim 11, wherein the battery exhibits at least 500 mAh/g of discharge capacity at a current density of greater than or equal to 0.1 mA/cm$^2$.

14. The battery of claim 11, wherein the battery can produce at least 3.0 V of average operating discharge potential at a current density of greater than or equal to 0.1 mA/cm$^2$.

15. The battery of claim 11, further comprising an anode, wherein the anode includes a coating layer that is coating an outer surface of an anode material, wherein the coating layer includes carbon and oxygen.

16. The battery of claim 11, further comprising an electrolyte, wherein a greenhouse gas is liquified, in contact with, dissolved in the electrolyte.

17. The battery of claim 16, wherein the greenhouse gas includes one or more of carbon dioxide ($CO_2$), methane ($CH_4$), tetrafluoromethane ($CF_4$), hexafluoroethane ($C_2F_5$), sulfur hexafluoride ($SF_6$), carbon tetrachloride ($CCl_4$), a perfluorocarbon, a chlorofluorocarbon, and a hydrofluorocarbon.

* * * * *